US008066252B2

(12) United States Patent
Murata et al.

(10) Patent No.: US 8,066,252 B2
(45) Date of Patent: Nov. 29, 2011

(54) METHODS AND SYSTEMS FOR LIFTING A VEHICLE

(75) Inventors: Roy P. Murata, Cerritos, CA (US); Raymond D. Fierro, Garden Grove, CA (US); John J. Brown, Costa Mesa, CA (US)

(73) Assignee: The Boeing Company, Chicago, IL (US)

( * ) Notice: Subject to any disclaimer, the term of this patent is extended or adjusted under 35 U.S.C. 154(b) by 1071 days.

(21) Appl. No.: 11/622,678

(22) Filed: Jan. 12, 2007

(65) Prior Publication Data

US 2008/0169410 A1 Jul. 17, 2008

(51) Int. Cl.
*F16M 1/00* (2006.01)
*F16M 3/00* (2006.01)
*F16M 7/00* (2006.01)
*F16M 9/00* (2006.01)

(52) U.S. Cl. ......... 248/671; 248/371; 248/677; 414/611

(58) Field of Classification Search .................. 248/317, 248/671, 677; 414/611, 678; 187/203, 204
See application file for complete search history.

(56) References Cited

U.S. PATENT DOCUMENTS 3,596,775 A 8/1971 Ingraham
3,602,544 A 8/1971 Marsh
3,612,484 A 10/1971 Gallagher et al.
3,814,211 A 6/1974 Pamer
4,336,460 A 6/1982 Best et al.
4,599,034 A * 7/1986 Kennedy et al. .............. 414/678
4,750,691 A 6/1988 Hollrock et al.
4,930,826 A 6/1990 Perren et al.
5,501,542 A * 3/1996 Hall, Sr. ........................ 403/306
6,062,396 A * 5/2000 Eason ............................ 211/20
6,203,472 B1 * 3/2001 McCaffrey et al. ............ 482/61
6,257,522 B1 7/2001 Friend et al.
6,416,098 B1 7/2002 Irwin et al.
7,073,778 B2 * 7/2006 Gibson et al. ................ 254/323
7,198,443 B2 * 4/2007 Macomber, III .................. 410/7
2005/0184194 A1 8/2005 Schaefer et al.

FOREIGN PATENT DOCUMENTS

GB 487477 6/1938
GB 565889 12/1944
GB 2179321 A 3/1987

OTHER PUBLICATIONS

International Search Report of PCT/US2007/088126; Jun. 3, 2008; 11 pages.

* cited by examiner

*Primary Examiner* — Amy J Sterling
(74) *Attorney, Agent, or Firm* — Armstrong Teasdale LLP

(57) ABSTRACT

In one embodiment, a system for lifting and supporting a vehicle is described. The system includes at least one vehicle hoist fitting configured to distribute the weight of the vehicle along a skin of the vehicle, at least one removable bearing cup assembly configured to attach to said vehicle hoist fitting, and at least one trunnion assembly configured for attachment to a support structure and further configured to engage said removable bearing cup assembly.

10 Claims, 8 Drawing Sheets

METHODS AND SYSTEMS FOR LIFTING A VEHICLE

STATEMENT REGARDING FEDERALLY SPONSORED RESEARCH OR DEVELOPMENT

This invention was made with Government support. The Government has certain rights in this invention.

BACKGROUND OF THE INVENTION

This invention relates generally to the transport and/or support of vehicles during manufacture or repair, and more specifically, to methods and systems for lifting and supporting a vehicle.

During the manufacture of a vehicle, or portions of a vehicle, it may be necessary to lift and transport the vehicle between stages of manufacture. The lifting may be necessary to allow access to areas of the vehicle that are being assembled. Also, during the repair or servicing of a vehicle, it may be necessary to lift and transport the vehicle to properly repair or service the vehicle.

Many vehicles, due to their shape or size, are a challenge to lift or support. These vehicles may incorporate added structural support or hardpoints designed into the vehicle structure so that the vehicle is not harmed during manufacture, repair, or while being transported. Added structural support typically results in an increase in vehicle weight or a protrusion extending from the vehicle structure. In certain vehicles, namely aircraft, keeping vehicle weight low is advantageous and may lead to higher performance and cost savings.

BRIEF DESCRIPTION OF THE INVENTION

In one embodiment, a system for lifting and supporting a vehicle is provided. The system includes at least one vehicle hoist fitting configured to distribute the weight of the vehicle along a skin of the vehicle, at least one removable bearing cup assembly configured to attach to said vehicle hoist fitting, and at least one trunnion assembly configured for attachment to a support structure and further configured to engage said removable bearing cup assembly.

In another embodiment, a method for providing a system to lift and support a vehicle is provided. The method includes providing an opening within a portion of a skin of the vehicle, the opening configured to provide access to a vehicle hoist fitting. The method also includes configuring the vehicle hoist fitting to receive a removable cup assembly and attaching the removable cup assembly to a support structure.

In yet another embodiment, a method for lifting and supporting a vehicle is provided. The method includes attaching at least one vehicle hoist fitting to an interior of a vehicle skin, positioning at least one removable cup assembly within the at least one vehicle hoist fitting, the at least one vehicle hoist fitting comprising a cup-shaped member configured to receive the at least one removable cup assembly, and positioning a portion of a trunnion assembly within the at least one removable cup assembly.

In yet another embodiment, a vehicle hoist assembly is provided. The vehicle hoist assembly includes a vehicle hoist fitting configured to be positioned substantially against an interior of a skin of a vehicle, the vehicle hoist fitting including a cup-shaped member. The vehicle hoist assembly further includes a removable cup assembly configured to be positioned within the vehicle hoist fitting and to rotatably engage a portion of a trunnion assembly.

DETAILED DESCRIPTION OF THE INVENTION

The methods and systems described herein are sometimes described in the context of an airplane. Such methods and systems, however, are not limited to practice in connection with just airplanes and can be used in connection with any aircraft or vehicle. As used herein, the term aircraft refers to airplanes, helicopters, missiles, satellites, spacecraft, and any object capable of flight. Furthermore, the term vehicle refers to any object capable of mobility including, but not limited to, automobiles, ships, tanks, trucks, and locomotives.

Figure 1:
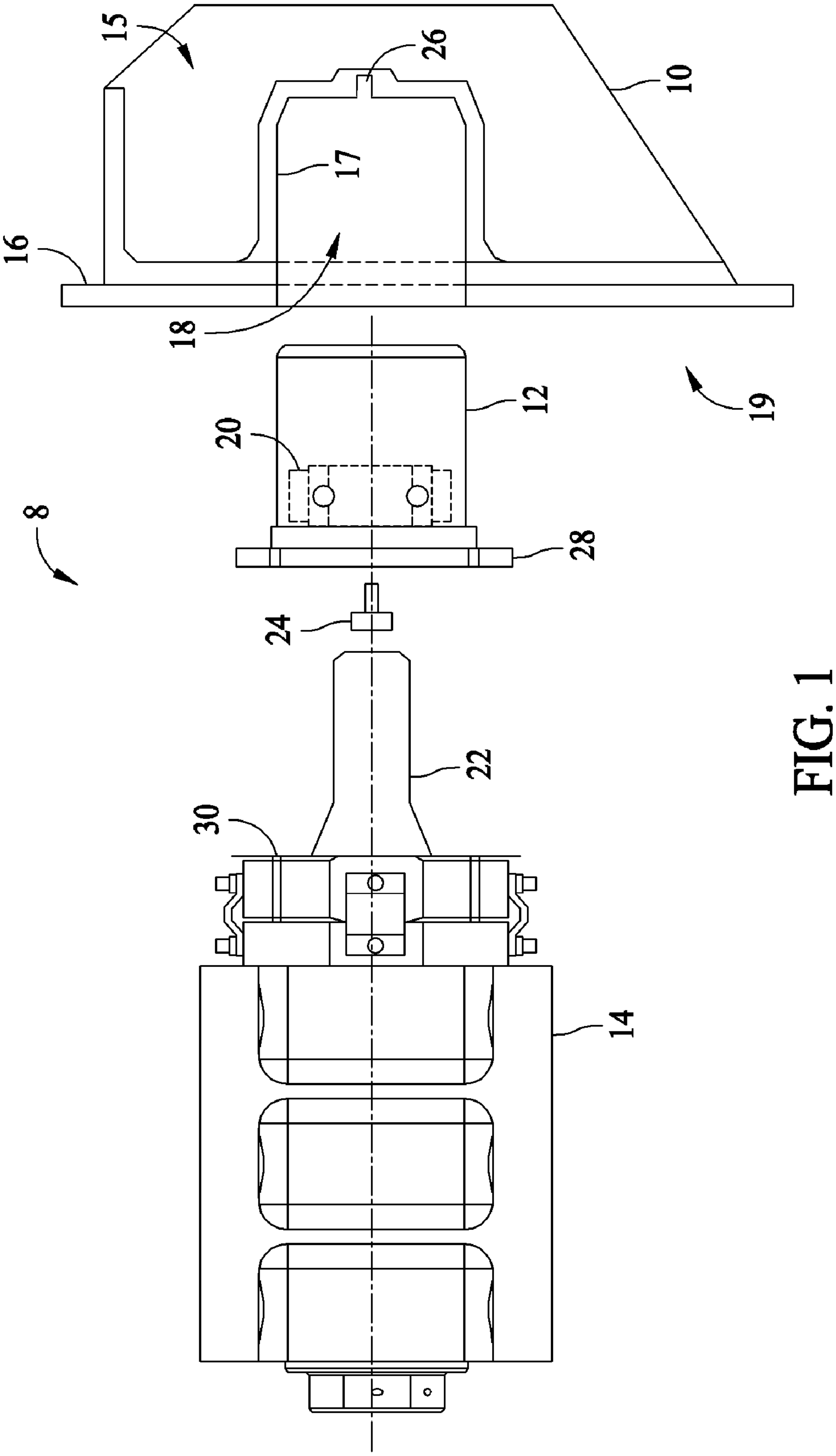
FIG. 1 is a partially exploded cutout view of a vehicle hoist fitting, a bearing cup assembly, and a trunnion assembly.

FIG. 1 is a partially exploded cutout view of a portion of a vehicle hoist assembly 8. Vehicle hoist assembly 8 includes a vehicle hoist fitting 10, a bearing cup assembly 12, and a trunnion assembly 14. Vehicle hoist fitting 10, bearing cup assembly 12, and trunnion assembly 14 are individual components that, when utilized together, form a portion of vehicle hoist assembly 8. In one embodiment, vehicle hoist fitting 10 is positioned within an interior portion 15 of vehicle structure 16. Vehicle structure 16 is also referred to herein as a vehicle skin. In exemplary embodiments, vehicle structure 16 may be composed of one or more of an advanced composite material and a metallic material.

Vehicle hoist fitting 10 includes a cup-shaped member 17 configured for insertion of bearing cup assembly 12. An opening 18 is positioned within vehicle structure 16. Opening 18 allows cup-shaped member 17 to be accessible from an exterior 19 of vehicle structure 16. Bearing cup assembly 12 includes a bearing housing 20 therein that is configured to engage a portion of trunnion assembly 14. The portion of trunnion assembly 14 that bearing housing 20 is configured to engage is referred to herein as trunnion pin 22. Bearing housing 20 allows trunnion pin 22 to rotate within bearing cup assembly 12. In one embodiment, bearing cup assembly 12 is temporarily attached to vehicle hoist fitting 10 by bearing cup retaining hardware 24 utilizing a hole (not shown in FIG. 1) formed in bearing cup assembly 12.

In one embodiment, bearing cup retaining hardware 24 includes at least one bolt. In this exemplary embodiment, vehicle hoist fitting 10 includes at least one bore 26, which in this described embodiment is threaded, and positioned such that when bearing cup assembly 12 is positioned within cup-shaped member 17, threaded bore 26 is located adjacent to bearing cup assembly 12. The at least one threaded bore 26 is configured to engage bearing cup retaining hardware 24. In combination, bearing cup retaining hardware 24 and threaded bore 26 prevent bearing cup assembly 12 from being removed from vehicle hoist fitting 10 without purposeful action. Bearing cup assembly may be temporarily attached to vehicle hoist fitting using the above described embodiment, or using any other components capable of temporarily securing bearing cup assembly to vehicle hoist fitting 10.

Bearing cup assembly 12 and vehicle hoist fitting 10 may also be configured such that bearing cup assembly 12 cannot rotate within vehicle hoist fitting 10. In one embodiment, bearing cup assembly 12 and cup-shaped member 17 are cylindrical. To prevent bearing cup assembly 12 from rotating, bearing cup retaining hardware 24 may include a plurality of bolts in combination with a plurality of threaded bores. In another exemplary embodiment, bearing cup assembly 12 and cup-shaped member 17 are shaped to prevent rotation. These shapes may include any non-cylindrical shape. For example, a square-shaped bearing cup assembly will not rotate within a square opening.

As described above, when vehicle hoist fitting 10 is properly placed, cup-shaped member 17 is positioned within vehicle structure 16 and is accessible from exterior 19 of the vehicle through opening 18. This accessibility allows bearing cup assembly 12 and trunnion assembly 14 to be installed from the exterior 19 of the vehicle, preventing the disturbance of any materials or other vehicle structure located within the interior 15 of the vehicle.

In an exemplary embodiment, the components of the vehicle hoist are made from one or more of titanium, aluminum, and corrosion resistant steel, however, any materials able to withstand the forces applied in a particular application of vehicle hoist assembly 8 may also be used.

Figure 2:
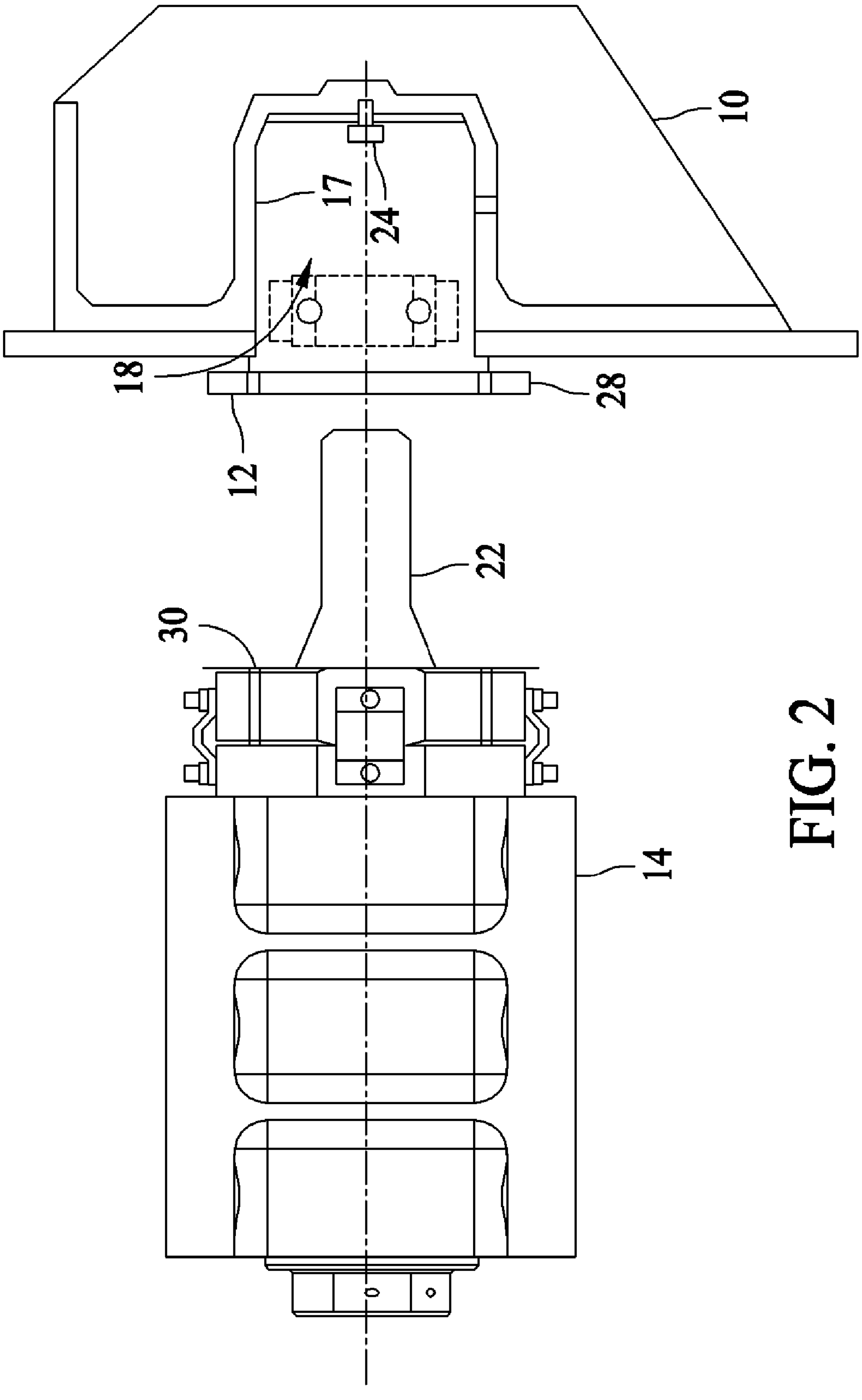
FIG. 2 is a second partially exploded cutout view of the bearing cup assembly engaging the vehicle hoist fitting.

FIG. 2 is a second partially exploded cutout view of the bearing cup assembly 12 engaging the vehicle hoist fitting 10. Bearing cup assembly 12 is positioned within cup-shaped member 17 and attached to vehicle hoist fitting 10 using bearing cup retaining hardware 24. The shape and size of cup-shaped member 17 substantially conforms to an exterior surface of bearing cup assembly 12 allowing for weight transfer from vehicle structure 16 to trunnion assembly 14.

In an exemplary embodiment, bearing cup assembly 12 includes a flange 28. Flange 28 extends from an edge of bearing cup assembly 12. In operation, when trunnion pin 22 is positioned within bearing cup assembly 12, a leading edge 30 of trunnion assembly 14 is in communication with flange 28. In one exemplary embodiment, flange 28 provides a smooth surface with which leading edge 30 slides across as trunnion pin 22 rotates within bearing cup assembly 12. Flange 28 may prevent wear to vehicle structure 16 that could occur if leading edge 30 was in direct contact with vehicle structure 16.

Figure 3:
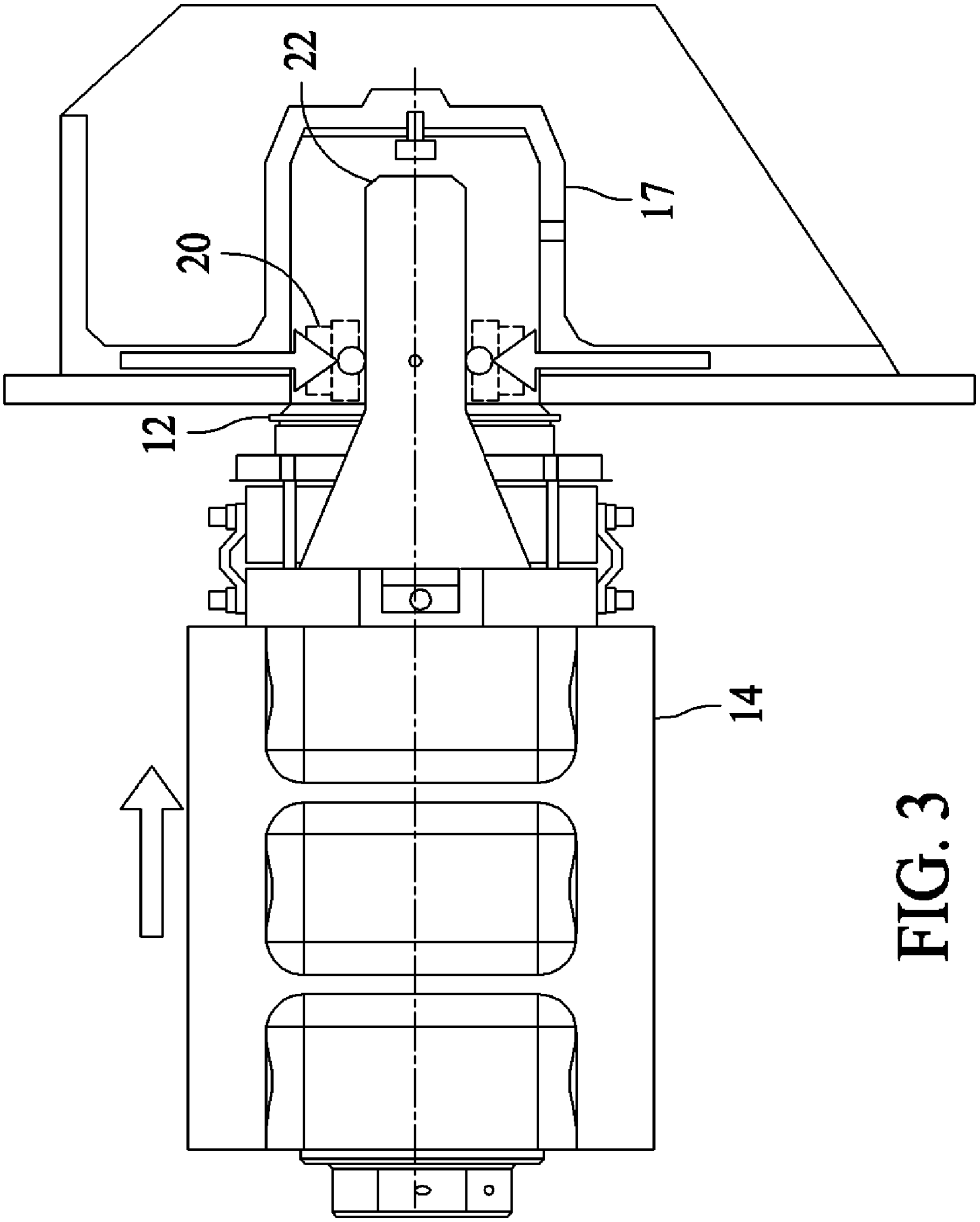
FIG. 3 is a third cutout view of the components of FIG. 1, where the trunnion assembly is engaging the bearing cup assembly, which is within the vehicle hoist fitting.

FIG. 3 is a third cutout view of vehicle hoist fitting 10, bearing cup assembly 12, and trunnion assembly 14. As in FIG. 2, bearing cup assembly 12 is positioned within cup-shaped member 17 and attached to vehicle hoist fitting 10. Also, trunnion assembly 14 is aligned with bearing cup assembly 12 and trunnion pin is positioned within bearing housing 20. Bearing housing 20 allows trunnion assembly 14 to rotate with respect to the vehicle.

Figure 4:
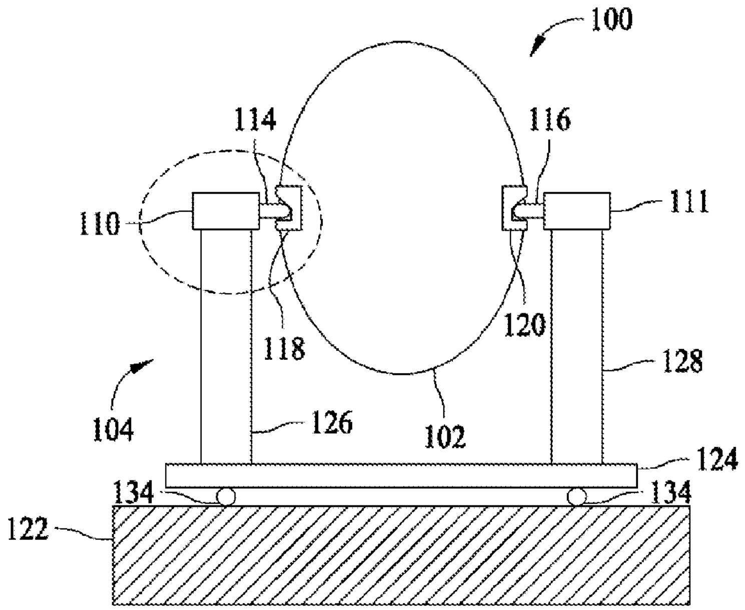
FIG. 4 is a front profile diagram of a first embodiment of a vehicle hoist incorporating the components illustrated in FIGS. 1-3.
Figure 5:
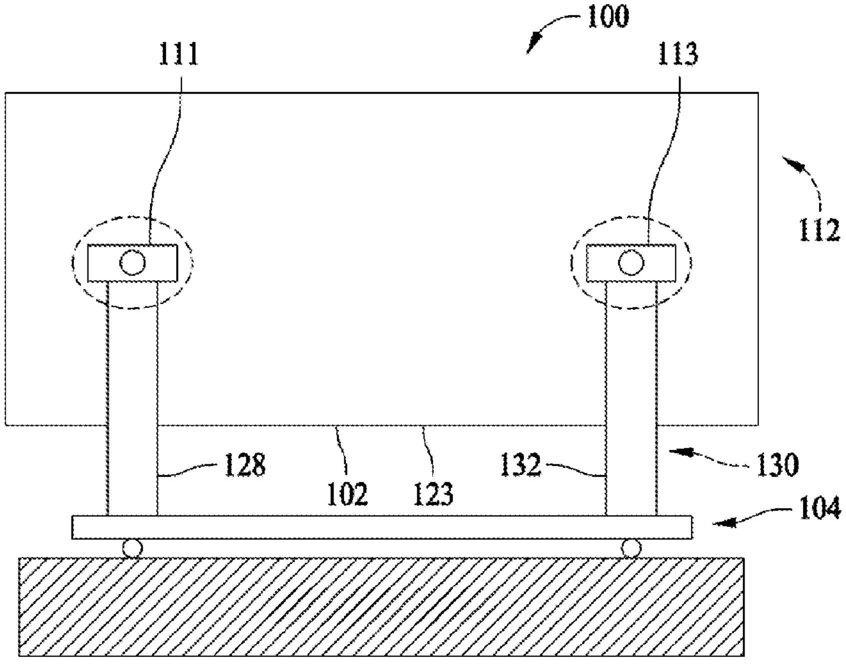
FIG. 5 is a side profile diagram of the vehicle hoist of FIG. 4.

FIG. 4 is a front profile diagram of an embodiment of a vehicle hoist assembly 100 incorporating the components illustrated in FIGS. 1-3. The portion of vehicle hoist assembly 8 described above is included in vehicle hoist assembly 100. FIG. 5 is a side profile diagram of vehicle hoist assembly 100 of FIG. 4. Vehicle hoist assembly 100 is supporting a vehicle

102, wherein vehicle 102 includes a plurality of vehicle hoist fittings 10. In the illustrated embodiment, vehicle hoist assembly 100 includes four trunnion assemblies, four bearing cup assemblies, and a support structure 104. Vehicle hoist assembly 100 includes trunnion assemblies 110 and 111, positioned on opposite sides of vehicle 102. Vehicle hoist assembly 100 also includes trunnion assemblies 112 and 113, which are orientated with respect to one another in the same manner as trunnion assemblies 110 and 111.

Also, as described with regard to FIGS. 1-3, each trunnion assembly 110, 111, 112, and 113 includes a trunnion pin (trunnion pins 114 and 116 are shown in FIG. 4, however, the remaining trunnion pins are not shown in FIG. 4). As described above, trunnion pins 114 and 116 engage bearing cup assemblies (not shown in FIG. 4) positioned within vehicle hoist fittings 118 and 120.

Each of the trunnion assemblies 110, 111, 112, and 113 are attached to support structure 104. Support structure 104 is a rigid assembly configured to provide an alignment of the trunnion assemblies with the vehicle hoist fittings for lifting and supporting vehicle 102 in a desired position. In an exemplary embodiment, the vehicle is positioned a distance from a ground level 122 so that a bottom 123 of the vehicle 102 is accessible for such actions as manufacture, repair, or maintenance. In this embodiment, support structure 104 includes a base 124 and a plurality of legs 126, 128, 130, and 132. Furthermore, in this embodiment, support structure 104 includes wheels 134. However, support structure 104 may include tracks, rollers, castors, skid plates, and any other apparatus that enables the support structure 104 to be mobile.

When vehicle 102 is held by vehicle hoist assembly 100, the weight of vehicle 102 is transferred from vehicle structure 16 via vehicle hoist fitting 10 and bearing housing 20 to vehicle hoist assembly 100. Vehicle structure 16 is configured to support the portion of the weight of the vehicle distributed to the vehicle structure 16 through vehicle hoist assembly 100. The trunnion pin 14 and bearing housing 20 absorb normal loads, which translate to vehicle structure shear loads, and minimize out-of-plane loads through the vehicle skin 16. Minimizing out-of-plane loads minimizes bending effects to adjoining delicate structure and sensitive equipment.

Figure 6:
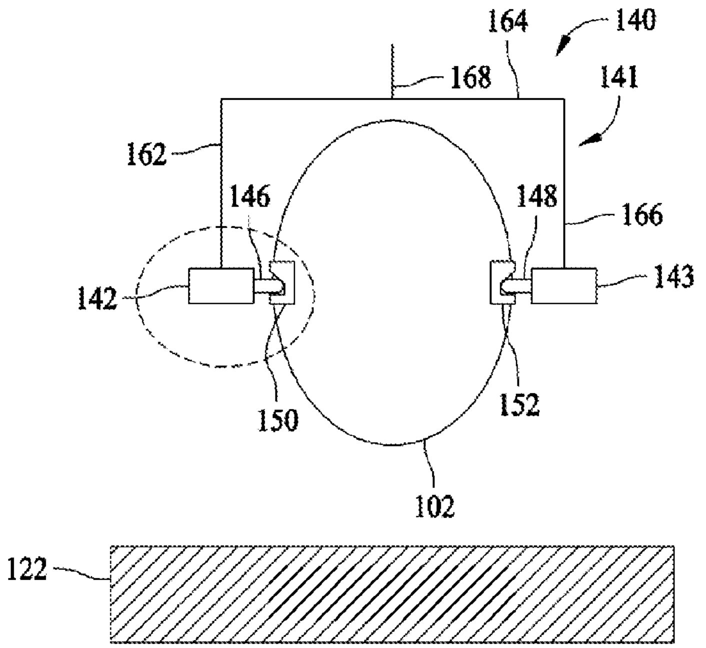
FIG. 6 is a front profile diagram of a second embodiment of a vehicle hoist incorporating the components illustrated in FIGS. 1-3.
Figure 7:
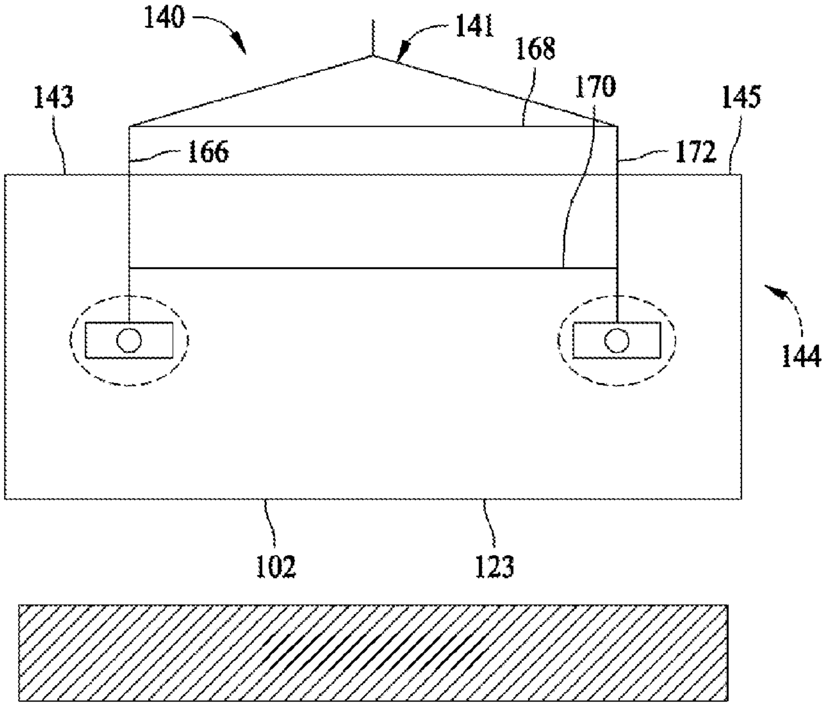
FIG. 7 is a side profile diagram of the vehicle hoist of FIG. 6.

FIG. 6 is a front profile diagram of a second embodiment of a vehicle hoist assembly 140 incorporating the components illustrated in FIGS. 1-3. FIG. 7 is a side profile diagram of vehicle hoist assembly 140 of FIG. 6. As stated above with regard to vehicle hoist assembly 100, vehicle hoist assembly 140 includes the portion of vehicle hoist assembly 8 described above and a support structure 141.

Vehicle hoist assembly 140 is supporting vehicle 102, wherein vehicle 102 includes vehicle hoist fittings. In the illustrated embodiment, vehicle hoist 140 includes a plurality of trunnion assemblies 142, 143, 144, and 145 attached to support structure 141. Also, as described with regard to FIGS. 1-3, each trunnion assembly 142, 143, 144, and 145 includes a trunnion pin. Trunnion pins 146 and 148 are shown in FIG. 6 that correspond to trunnion assemblies 142 and 143 respectively. Trunnion assemblies 144 and 145 include similarly positioned trunnion pins. Trunnion pins 146 and 148 engage bearing cup assemblies (not shown in FIG. 6) positioned within vehicle hoist fittings 150 and 152.

Trunnion assemblies 142, 143, 144, and 145 are connected to support structure 141. Support structure 141, in the illustrated embodiment, is a rigid assembly configured to provide an alignment of the trunnion assemblies 142, 143, 144, and 145 with the vehicle hoist fittings for lifting and supporting the vehicle 102 in a desired position. In an exemplary embodiment, the vehicle 102 is positioned a distance from ground level 122 so that a bottom 123 of vehicle 102 is accessible for actions such as, for example, manufacturing, repair, or maintenance of the vehicle. Vehicle hoist 140 may also be used to support and restrain a vehicle during transport. For example, vehicle hoist 140 may be positioned on a truck, airplane, ship, or any other form of transportation, to securely hold vehicle 102 during transport.

In the embodiment of FIGS. 6 and 7, support structure 141 includes support beams 162, 164, 166, 168, 170, and 172 rigidly connected such that trunnion assemblies 142, 143, 144, and 145 remain aligned with corresponding vehicle hoist fittings. Vehicle hoist fittings 150 and 152 are shown in FIG. 6. Vehicle hoist assembly 140 also includes vehicle hoist fittings that correspond to trunnion assemblies 144 and 145 but are not shown.

Unlike support structure 104 where vehicle 102 is held a distance from ground level 122 by legs 126, 128, 130, and 132 that transfer the weight of vehicle 102 to the ground, support structure 141 suspends vehicle 102 a distance from ground level 122 using, for example, a hanger 168. In an exemplary embodiment, hanger 168 transfers the weight of vehicle 102 to an overhead track attached to a ceiling of a building (not shown in FIG. 6). In another exemplary embodiment, hanger 168 transfers the weight of vehicle 102 to a crane (not shown in FIG. 6) that suspends vehicle 102 above ground level 122.

Vehicle hoist assemblies 100 and 140 are each described above as including four trunnion assemblies. However, vehicle hoist assemblies 100 and 140 may include any number of trunnion assemblies so long as at least one trunnion assembly is positioned on an opposing side of the vehicle from another trunnion assembly. In another specific embodiment, vehicle hoist assembly 100 includes two trunnion assemblies, positioned on opposing sides of vehicle 102 and aligned with two bearing cup assemblies 12 and vehicle hoist fittings 10.

The bearing cup assembly 12 of the above described embodiments includes a cup-shaped opening, which when used with vehicle hoist fitting 10, provides a trunnion connection point that extends into the structure of the vehicle. Furthermore, a portion of trunnion assembly 14 is configured to be positioned within the cup-shaped opening. In an alternative embodiment, the positions of the trunnion pin and the bearing cup assembly are reversed. In this embodiment, vehicle hoist fitting 10 is configured such that a removable trunnion pin extends from exterior 19 of the vehicle. Furthermore, in this embodiment, a bearing cup assembly is attached to a support structure, for example support structures 104 and 141. In operation, the bearing cup assemblies are configured to engage the trunnion pins in order to lift and support the vehicle.

Figure 8:
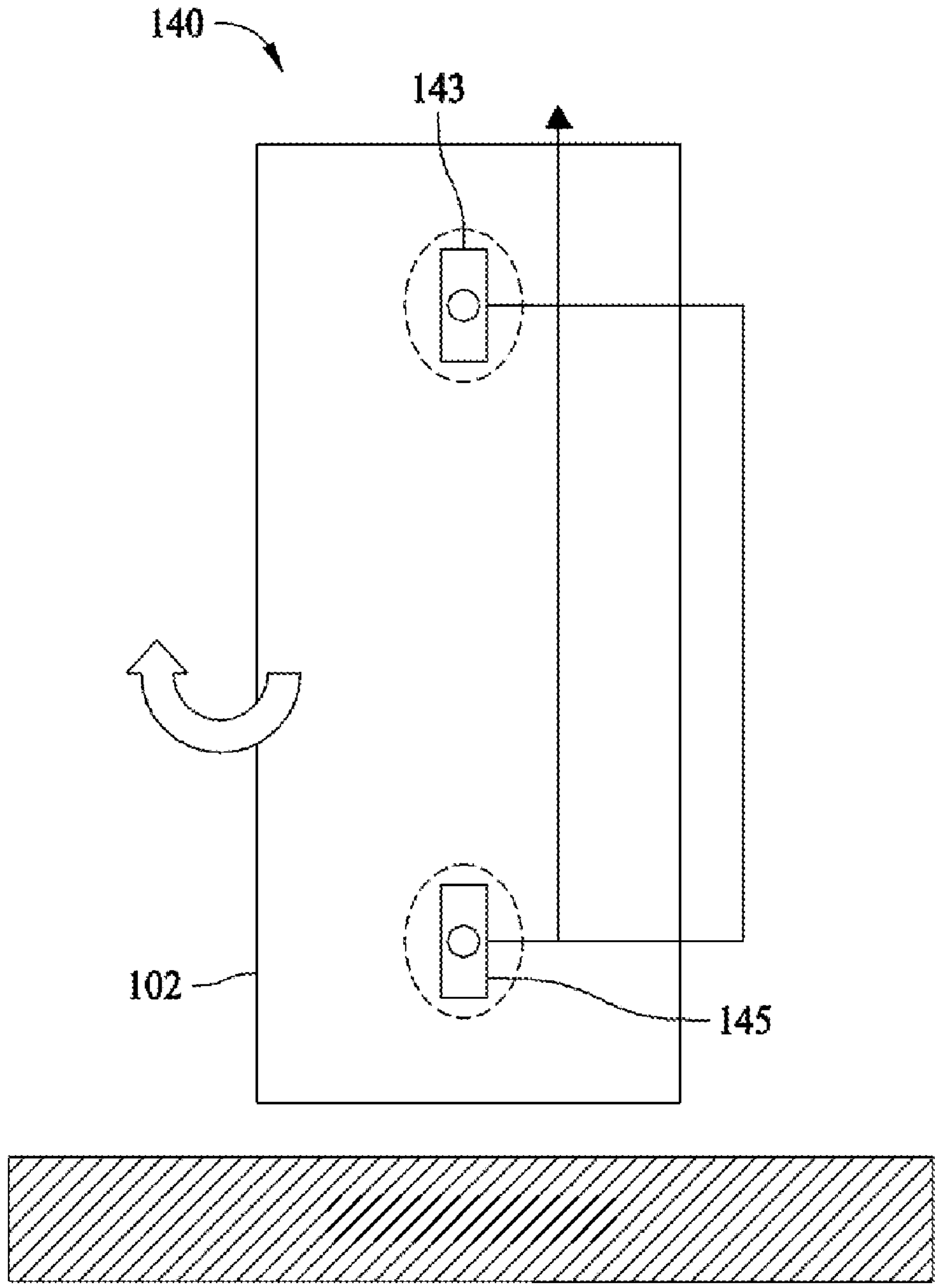
FIG. 8 is a side profile diagram of a vehicle hoist.

FIG. 8 is another side profile diagram of vehicle hoist assembly 140. Vehicle hoist assembly 140 includes trunnion assemblies 143 and 145. As described above, the bearing housings 20 (shown in FIG. 1) allow the trunnion pins 22 to rotate within the bearing cup assemblies 12. This rotatable connection allows vehicle hoist assemblies 100 and 140 to not only lift and support vehicle 102, but also to rotate vehicle 102 up to 90 degrees from the position shown in FIGS. 4-7. FIG. 8 shows vehicle 102 rotated 90 degrees from the position shown in FIGS. 4-7. Allowing for lifting and rotating increases flexibility during manufacture, ground handling, service, maintenance, transportation of the vehicle, as well as pre-flight and post-flight operational activities of the vehicle.

Figure 9:
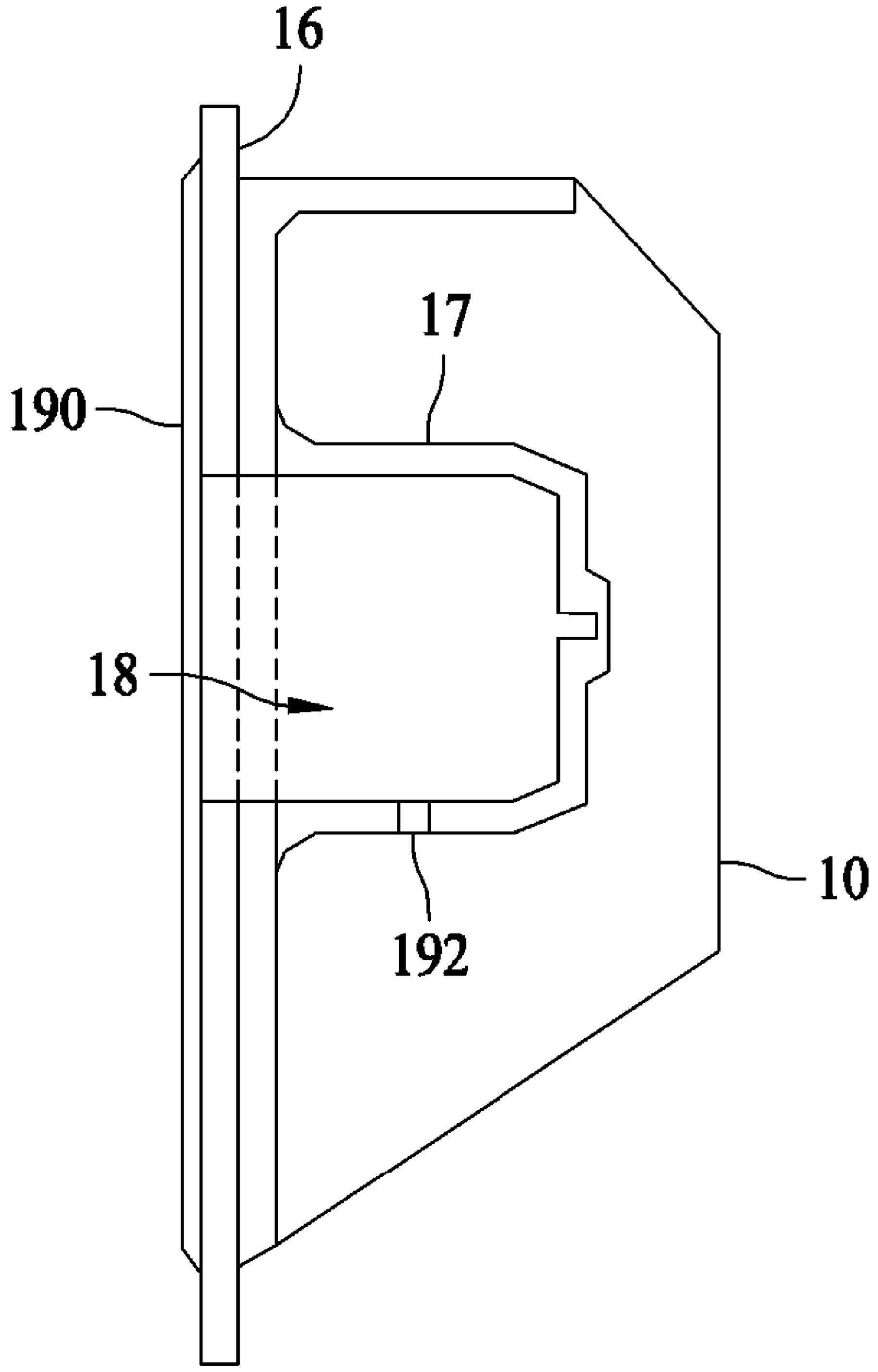
FIG. 9 is a cutout view of a vehicle hoist fitting.

FIG. 9 is a cutout view of a vehicle hoist fitting, for example, vehicle hoist fitting 10 of FIG. 1. In operation, the vehicle hoist assembly is used to place the vehicle in a resting position. In one example embodiment, an aircraft positioned on its landing gear is in a resting position. In another example embodiment, a missile positioned in a crate for shipment is in a resting position. Once the vehicle is in a resting position, trunnion assembly 14 is removed from bearing cup assembly 12 (not shown in FIG. 9). Also, bearing cup assembly 12 is removed from cup-shaped member 17 of vehicle hoist fitting 10 and a cover 190 is positioned and attached to exterior 19 of vehicle structure 16 such that cover 190 covers opening 18, with vehicle hoist fitting 10 remaining within the vehicle.

For many vehicles, most particularly aircraft, by reducing the operating weight of the vehicle, the performance of the vehicle is improved and the cost of operation is reduced. Bearing cup assembly 12, in combination with vehicle hoist fitting 10, provide the strength to support the vehicle from a vehicle hoist. Since bearing cup assembly 12 is removable, the vehicle only includes the added weight of bearing cup assembly 12 when the bearing cup assembly 12 is necessary, which is during, for example, manufacture, repair, and transportation of the vehicle before operation. Once in a resting position, the bearing cup assembly 12 is removed. Removing the bearing cup assembly 12 reduces the overall weight of the vehicle as compared to known structures that permanently include added structural support or hardpoints used in conjunction with a vehicle hoist system to lift and support the vehicle.

Furthermore, for many vehicles, particularly aircraft, low wind resistance during operation is desirable. Cover 190 increases the aerodynamics of the vehicle as compared to not covering opening 18 or as compared to having a protrusion extending therefrom. In an exemplary embodiment, once installed, cover 190 transitions smoothly into vehicle structure 16.

In certain other embodiments, vehicle structure 16 is configured to provide thermal protection to the vehicle structure 16 and therefore also the contents held within the vehicle. In certain embodiments, vehicle structure 16 includes ceramic tiles or is covered by ceramic tiles that deflect heat in order to protect the vehicle structure 16 and therefore the contents of the vehicle. In one embodiment, cover 190 also protects the vehicle structure 16 from heat.

In another embodiment, once cover 190 is positioned over opening 18, a volume of air is trapped between vehicle hoist fitting 10 and cover 190. In an exemplary embodiment, a pressure vent 192 may be included within vehicle hoist fitting 10 to prevent damage to one or more of vehicle hoist fitting 10, vehicle structure 16, and cover 190. This damage may be caused by the varying pressure exerted on cover 190 by the trapped air due to a changing altitude of the vehicle.

Figure 10:
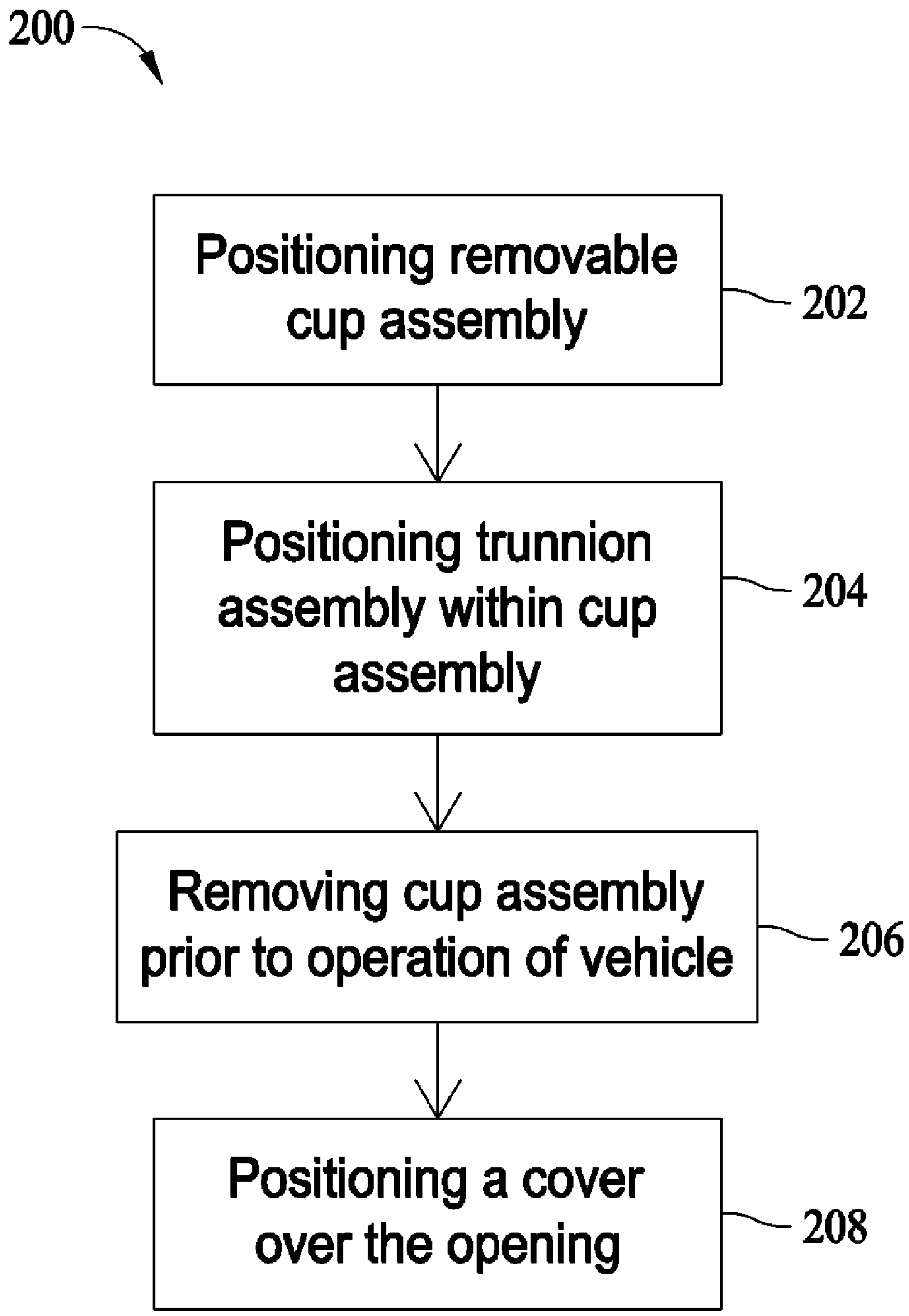
FIG. 10 is a flow chart of a method for lifting and supporting a vehicle.

FIG. 10 is a flow chart of a method 200 for lifting and supporting a vehicle. Method 200 includes positioning 202 a removable cup assembly within a vehicle hoist fitting. In an exemplary embodiment, a plurality of removable cup assemblies are positioned within a plurality of vehicle hoist fittings. Method 200 also includes positioning 204 a portion of a trunnion assembly within the removable cup assembly. As described above, in an exemplary embodiment, a plurality of trunnion assemblies are aligned with the plurality of removable cup assemblies. By positioning 202 the removable cup assemblies within the vehicle hoist fittings and positioning 204 a portion of the trunnion assemblies within the removable cup assemblies, the vehicle may be lifted, held, and rotated in a variety of positions to facilitate manufacturing processes, ground handling, service, maintenance, transportation of the vehicle and pre-flight and post-flight activities.

Method 200 further includes removing 206 the cup assembly prior to operation of the vehicle. Removing 206 the cup assembly prior to operation of the vehicle minimizes the amount of hoist structure that is carried by the vehicle while operating. In an exemplary embodiment of an airplane, the airplane is considered to be operating during takeoff, flight, and landing. In an exemplary embodiment of an aircraft, the reduced weight may provide an improvement in performance, a reduction in fuel usage, and a reduction in operating cost. Method 200 may further include positioning 208 a cover over an opening left in the vehicle upon removal of the cup assembly.

While the invention has been described in terms of various specific embodiments, those skilled in the art will recognize that the invention can be practiced with modification within the spirit and scope of the claims.

What is claimed is:

1. A system for lifting and supporting a vehicle, said system comprising:

at least one vehicle hoist fitting adapted for use with a vehicle, said at least one vehicle hoist fitting configured to distribute the weight of the vehicle along a skin of the vehicle, said at least one vehicle hoist fitting configured to be positioned adjacent to an interior surface of the skin of the vehicle and substantially within the vehicle;

at least one removable bearing cup assembly configured to insert into and attach to said vehicle hoist fitting; and at least one trunnion assembly configured for attachment to a support structure and further configured to engage said removable bearing cup assembly.

2. A system according to claim 1 wherein said at least one removable bearing cup assembly is accessible from an exterior of the vehicle.

3. A system according to claim 1 further comprising a support structure, said at least one trunnion assembly comprising a plurality of trunnion assemblies, said support structure configured to maintain spacing of said trunnion assembly from other said trunnion assemblies, and align said trunnion assembly with said at least one removable bearing cup assembly.

4. A system according to claim 3 wherein said support structure includes at least one leg, said at least one leg positioned between the vehicle and the ground and configured to hold the vehicle a distance above the ground.

5. A system according to claim 3 wherein said support structure includes at least one hanger, said at least one hanger configured to hold the vehicle a distance above the ground by suspending the vehicle from a structure above the vehicle.

6. A system according to claim 1 wherein said at least one vehicle hoist fitting includes a cup-shaped member configured to receive said at least one removable bearing cup assembly.

7. A system according to claim 6 wherein said cup-shaped member and said vehicle hoist fitting are non-cylindrical.

8. A system according to claim 1 wherein said at least one removable bearing cup assembly further comprises a bearing housing.

9. A system according to claim 8 wherein said bearing housing is configured to rotatably engage a portion of said trunnion assembly.

10. A system according to claim 8 wherein said bearing housing is configured to allow up to 90 degrees of vehicle rotation.

* * * * *